United States Patent
Chong et al.

(10) Patent No.: US 10,244,448 B2
(45) Date of Patent: *Mar. 26, 2019

(54) METHOD FOR CONTROLLING USER EQUIPMENT TO ACCESS COMMUNICATIONS NETWORK OF HIGH-SPEED MOVING VEHICLE

(71) Applicant: Huawei Technologies Co., Ltd., Shenzhen (CN)

(72) Inventors: Weiwei Chong, Shanghai (CN); Xiaobo Wu, Shanghai (CN); Wanqiang Zhang, Munich (DE); Chunshan Xiong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/471,069

(22) Filed: Mar. 28, 2017

(65) Prior Publication Data

US 2017/0201919 A1 Jul. 13, 2017

Related U.S. Application Data

(63) Continuation of application No. PCT/CN2014/087804, filed on Sep. 29, 2014.

(51) Int. Cl.
*H04W 36/14* (2009.01)
*H04W 36/32* (2009.01)
(Continued)

(52) U.S. Cl.
CPC ....... *H04W 36/14* (2013.01); *H04W 36/0033* (2013.01); *H04W 36/32* (2013.01);
(Continued)

(58) Field of Classification Search
CPC .......................... H04W 36/14; H04W 36/0033
See application file for complete search history.

(56) References Cited

U.S. PATENT DOCUMENTS 8,681,753 B2    3/2014  Kokkinen et al.
2006/0234676 A1* 10/2006  Harris ..................... H04L 63/08
                                                455/410
(Continued)

FOREIGN PATENT DOCUMENTS

CN    101583169 A    11/2009
CN    101873566 A    10/2010
(Continued)

OTHER PUBLICATIONS

"New SI: LTE Enhancement under High Speed Scenario," Source: Huawei, HiSilicon, Agenda Item: 11, Document for: Information, 3GPP TSG-RAN WG4 Meeting #72, R4-144511, Dresden, Germany, Aug. 18-22, 2014, 8 pages.

(Continued)

*Primary Examiner* — Zhiren Qin
(74) *Attorney, Agent, or Firm* — Slater Matsil, LLP

(57) ABSTRACT

A method for controlling user equipment (UE) to access a communications network of a high-speed moving vehicle, a core network control plane node device, a base station, UE, and a communications system. The method includes determining that UE accessing a public network is first-type UE, and transferring the UE to the communications network of the high-speed moving vehicle. The first-type UE is UE used by a user taking the high-speed moving vehicle.

20 Claims, 7 Drawing Sheets

(51) Int. Cl.
 *H04W 48/04* (2009.01)
 *H04W 36/00* (2009.01)
 *H04W 36/08* (2009.01)

(52) U.S. Cl.
 CPC ........ *H04W 48/04* (2013.01); *H04W 36/0066* (2013.01); *H04W 36/08* (2013.01)

(56) References Cited

U.S. PATENT DOCUMENTS

| | | | |
|---|---|---|---|
| 2010/0069073 A1 | 3/2010 | Chen et al. | |
| 2012/0088509 A1* | 4/2012 | Yi | H04W 24/10 455/437 |
| 2013/0171995 A1 | 7/2013 | Fujishiro et al. | |
| 2013/0295931 A1* | 11/2013 | Yu | H04W 36/32 455/435.1 |
| 2014/0335865 A1* | 11/2014 | Zhang | H04W 36/08 455/436 |
| 2015/0304905 A1* | 10/2015 | Gao | H04W 36/0083 455/11.1 |
| 2016/0286442 A1* | 9/2016 | Huang | H04W 36/16 |
| 2017/0048692 A1* | 2/2017 | Huang | H04W 36/08 |

FOREIGN PATENT DOCUMENTS

| | | |
|---|---|---|
| CN | 102300279 A | 12/2011 |
| CN | 102413520 A | 4/2012 |
| CN | 102647766 A | 8/2012 |
| CN | 102938917 A | 2/2013 |
| CN | 103167569 A | 6/2013 |
| CN | 103702329 A | 4/2014 |
| CN | 103813403 A | 5/2014 |
| RU | 2486702 C2 | 6/2013 |
| WO | 2005104592 A1 | 11/2005 |
| WO | 2011011958 A1 | 2/2011 |
| WO | 2013097063 A1 | 7/2013 |

OTHER PUBLICATIONS

Zhu, X. et al., "TDD-Based Mobile Communication Solutions for High-Speed Railway Scenarios," IEEE Wireless Communications, Dec. 2013, 8 pages.

\* cited by examiner

METHOD FOR CONTROLLING USER EQUIPMENT TO ACCESS COMMUNICATIONS NETWORK OF HIGH-SPEED MOVING VEHICLE

CROSS-REFERENCE TO RELATED APPLICATIONS

This application is a continuation of International Application No. PCT/CN2014/087804, filed on Sep. 29, 2014, the disclosure of which is hereby incorporated by reference in its entirety.

TECHNICAL FIELD

The present invention relates to the field of mobile communications technologies, and in particular, to a method for controlling user equipment to access a communications network of a high-speed moving vehicle, a core network control plane node device, a base station, and a communications system.

BACKGROUND

High-speed moving vehicles develop rapidly in China and all over the world. For example, the high-speed moving vehicles include a high-speed railway train, a magnetic levitation train, and a metro. The high-speed railway train is used as an example. Operating mileage of the high-speed railway train is over 30000 kilometers and is increasing rapidly. Many high-end persons frequently take the high-speed moving vehicles for a long time, and the high-speed moving vehicles require information-based construction. Therefore, there is an ever-increasing communication requirement of the high-speed moving vehicles.

However, the high-speed moving vehicles are different from conventional indoor and outdoor mobile communications scenarios. Because a train is moving at a high speed, a train body has a large penetration loss, scenes and terrains are complicated and varied, and the like, a current public network is not suitable for providing services for users taking the high-speed moving vehicles. Therefore, it is increasingly urgent to establish a dedicated network that provides a service for users taking high-speed moving vehicles. For example, currently there are equipment vendors and operators that have begun to plan and deploy such a high-speed railway dedicated wireless network (referred to as a "high-speed railway dedicated network" in the following). The high-speed railway dedicated network covers an ongoing journey of a high-speed railway train and areas near a platform of the high-speed railway station. Cell deployment in a high-speed railway station area is shown in FIG. 1A. Dedicated network cells of the high-speed railway station within coverage of a high-speed railway dedicated network 106 include an indoor distributed cell and a platform cell. Both a waiting room 102 and an entrance and exit passageway 103 belong to the indoor distributed cell 101. A platform 104 belongs to the platform cell. A public network cell 105 covers a railway station square outside the railway station. Currently, the dedicated network cell and the public network cell are individually deployed during high-speed railway network planning. In consideration of line-type coverage of a railway, a solution of cell cascading and continuous coverage is used for the high-speed railway dedicated network, as shown in FIG. 1B. In the example of FIG. 1B, a high-speed railway track area is continuously covered by cascaded dedicated network cells 111, and public network cells 115 also cover the high-speed railway track area.

The public network and the high-speed railway dedicated network use the following cooperation principles.

(1) In most areas of a high-speed railway (for example, on an ongoing journey of a high-speed railway train), a neighboring cell relationship is not mutually configured between a high-speed railway dedicated network cell and a surrounding public network cell. That is, only a cascaded cell in the dedicated network is configured as a neighboring cell of the dedicated network cell, and no public network cell is configured as a neighboring cell of the dedicated network cell; and no dedicated network cell is configured as a neighboring cell of the public network cell.

(2) A mutual neighboring cell relationship is configured, between a public network cell and a dedicated network cell, near the platform of the railway station, so that first-type UE accesses a dedicated network cell (such as the dedicated network cell 101 in FIG. 1A) from a public network cell (such as the public network cell 105 in FIG. 1A), or accesses a public network cell from a dedicated network cell.

On an ongoing journey of a high-speed railway train, because there is no mutual neighboring cell relationship between a high-speed railway dedicated network cell and a surrounding public network cell, user equipment (UE for short) in an idle state cannot access another type of network cell (such as the dedicated network cell 111 in FIG. 1B) from one type of network cell (such as the public network cell 115 in FIG. 1B) by performing cell reselection, and the UE in a connected state cannot be handed over to another type of network cell by performing a handover procedure. Therefore, on an ongoing journey of a high-speed moving vehicle, when UE is detached from a communications network of the high-speed moving vehicle due to an exception and accesses a public network, the UE cannot subsequently return to the communications network of the high-speed moving vehicle in the prior art, and this affects user experience of a user taking the high-speed moving vehicle.

SUMMARY

According to a first aspect, the present invention provides a method for controlling user equipment UE to access a communications network of a high-speed moving vehicle, including determining, by a first core network control plane node device, that UE accessing a public network is first-type UE, where the first-type UE is UE used by a user taking the high-speed moving vehicle, and transferring, by the first core network control plane node device, the UE to the communications network of the high-speed moving vehicle.

According to a second aspect, the present invention provides a method for controlling user equipment UE to access a communications network of a high-speed moving vehicle, including receiving, by a public network base station, indication information sent by a core network control plane node device, where the indication information is sent to the public network base station after the core network control plane node device determines that UE accessing a public network is first-type UE, the indication information is used to indicate that the UE accessing the public network is first-type UE, and the first-type UE is UE used by a user taking the high-speed moving vehicle; and transferring, by the public network base station, the UE to the communications network of the high-speed moving vehicle according to the indication information.

According to a third aspect, the present invention further provides a method for controlling user equipment UE to access a communications network of a high-speed moving vehicle, including determining, by a second core network control plane node device, that UE accessing the communications network of the high-speed moving vehicle is first-type UE, where the first-type UE is UE used by a user taking the high-speed moving vehicle, and, when the UE accesses a public network, sending, by the second core network control plane node device, notification information to a first core network control plane node device, where the notification information is used to indicate that the UE is first-type UE, so that the first core network control plane node device transfers the UE accessing the public network to the communications network of the high-speed moving vehicle.

According to a fourth aspect, the present invention further provides a method for controlling user equipment UE to access a communications network of a high-speed moving vehicle, including determining, by a core network control plane node device, that UE accessing the communications network of the high-speed moving vehicle is not first-type UE, where the first-type UE is UE used by a user taking the high-speed moving vehicle, and sending, by the core network control plane node device, indication information to a base station of the communications network of the high-speed moving vehicle, where the indication information is used to indicate the base station that the UE is non-first-type UE, so that the base station migrates the UE out of the communications network of the high-speed moving vehicle.

According to a fifth aspect, the present invention further provides a method for controlling user equipment UE to access a communications network of a high-speed moving vehicle, including receiving, by a base station of the communications network of the high-speed moving vehicle, indication information sent by a core network control plane node device, where the indication information is sent to the base station after the core network control plane node device determines that UE accessing the communications network of the high-speed moving vehicle is not first-type UE, and the indication information is used to indicate that the UE is non-first-type UE, and migrating, by the base station, the UE out of the communications network of the high-speed moving vehicle according to the indication information.

According to a sixth aspect, the present invention further provides a first core network control plane node device, including: a processor, configured to determine that user equipment UE accessing a public network is first-type UE, where the first-type UE is UE used by a user taking the high-speed moving vehicle, and the first core network control plane node device is configured to transfer the UE to a communications network of the high-speed moving vehicle.

According to a seventh aspect, the present invention further provides a public network base station, including a transceiver and a processor. The transceiver is configured to receive indication information sent by a core network control plane node device, where the indication information is sent to the base station after the core network control plane node device determines that user equipment UE accessing a public network is first-type UE, the indication information is used to indicate that the UE accessing the public network is first-type UE, and the first-type UE is UE used by a user taking the high-speed moving vehicle. The processor is configured to transfer the UE to a communications network of the high-speed moving vehicle according to the indication information.

According to an eighth aspect, the present invention further provides a second core network control plane node device, including a transceiver and a processor. The processor is configured to determine that user equipment UE accessing a communications network of a high-speed moving vehicle is first-type UE, where the first-type UE is UE used by a user taking the high-speed moving vehicle. The transceiver is configured to send notification information to a first core network control plane node device, where the notification information is used to indicate that the UE is first-type UE, so that the first core network control plane node device transfers the UE accessing a public network to the communications network of the high-speed moving vehicle.

According to a ninth aspect, the present invention further provides a core network control plane node device, including a transceiver and a processor. The processor is configured to determine that user equipment UE accessing a communications network of a high-speed moving vehicle is not first-type UE, where the first-type UE is UE used by a user taking the high-speed moving vehicle. The transceiver is configured to send indication information to a base station of the communications network of the high-speed moving vehicle, where the indication information is used to indicate the base station that the UE is non-first-type UE, so that the base station migrates the UE out of the communications network of the high-speed moving vehicle.

According to a tenth aspect, the present invention further provides a base station of a communications network of a high-speed moving vehicle, including a transceiver and a processor. The transceiver is configured to receive indication information sent by a core network control plane node device, where the indication information is sent to the base station after the core network control plane node device determines that user equipment UE accessing the communications network of the high-speed moving vehicle is not first-type UE, and the indication information is used to indicate that the UE is non-first-type UE. The processor is configured to migrate the UE out of the communications network of the high-speed moving vehicle according to the indication information.

According to the method for controlling user equipment to access a communications network of a high-speed moving vehicle, the core network control plane node device, the base station, and a communications system provided in embodiments of the present invention, a first core network control plane node device may determine that UE accessing a public network is first-type UE. The first-type UE is UE used by a user taking the high-speed moving vehicle. After determining that the UE accessing the public network is first-type UE, the first core network control plane node device transfers the UE to the communications network of the high-speed moving vehicle. Therefore, on an ongoing journey of the high-speed moving vehicle, even if UE is detached from the communications network of the high-speed moving vehicle and accesses the public network due to an exception, the UE can access the communications network of the high-speed moving vehicle again, and this improves user experience of a user taking the high-speed moving vehicle.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1A:
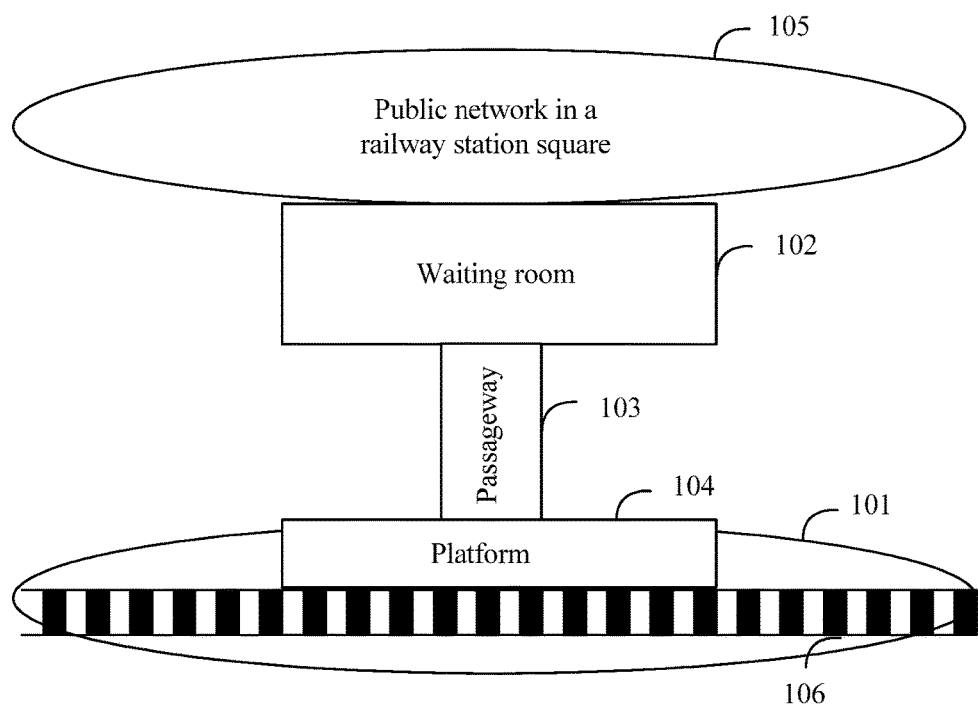
FIG. 1A is a schematic diagram of cell deployment of a high-speed railway dedicated network and a public network in a high-speed railway station area.
Figure 1B:
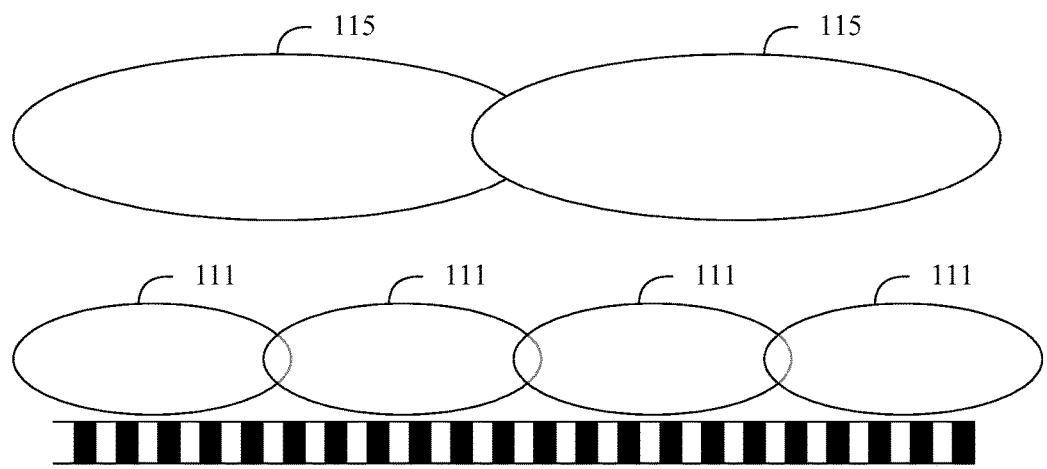
FIG. 1B is a schematic diagram of cell deployment of a high-speed railway dedicated network and a public network along a track area of a high-speed railway train.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The present invention is used to control UE to access a communications network of a high-speed moving vehicle, so that UE that belongs to a user taking the high-speed moving vehicle can still return to the communications network of the high-speed moving vehicle even if the UE is detached from the communications network of the high-speed moving vehicle due to an exception and accesses a public network on an ongoing journey. In the following description, the UE used by the user taking the high-speed moving vehicle (for example, a high-speed railway train) is referred to as first-type UE, and UE used by a user who does not take the high-speed moving vehicle is referred to as non-first-type UE.

A communications network of a high-speed moving vehicle applicable to the present invention refers to a dedicated network that provides a communication service for a user taking the high-speed moving vehicle. The communications network includes but is not limited to a Long Term Evolution (LTE for short) network, a Global system for mobile communications (GSM for short) network, or a Universal Mobile Telecommunications System (UMTS for short) network. In a scenario of any one of the foregoing networks, a communications system includes at least a core network control plane node device, UE, and a base station. In the LTE network, the core network control plane node device includes but is not limited to a mobility management entity (MME for short), and the base station includes but is not limited to an E-UTRAN NodeB (eNodeB for short). In the GSM network or the UMTS network, the core network control plane node device includes but is not limited to a serving general packet radio service (GPRS for short) support node (SGSN for short), or a mobile switching center (MSC for short), and the base station includes but is not limited to a base station controller (BSC for short), or a radio network controller (RNC for short). In the present invention, different access network devices (for example, eNodeBs) are separately deployed in a public network and the communications network of the high-speed moving vehicle.

The following provides description by using an example that the high-speed moving vehicle is a high-speed railway train, and the communications network of the high-speed moving vehicle is a high-speed railway LTE dedicated network (high-speed railway dedicated network for short). However, the present invention is not limited thereto. The high-speed moving vehicle includes but is not limited to the high-speed railway train, a magnetic levitation train, or a metro. Moreover, the present invention is also applicable to the GSM network or the UMTS network.

For example, coverage scenarios of a high-speed railway dedicated network may be classified into two cases: a high-speed railway station and an ongoing journey of the high-speed railway train. The high-speed railway station is covered by a platform cell and an indoor distributed cell, and the ongoing journey of the high-speed railway train is covered by cascaded dedicated network cells. In addition, both the high-speed railway station and the ongoing journey are further at least partly covered by a public network cell near the high-speed railway dedicated network.

Figure 2:
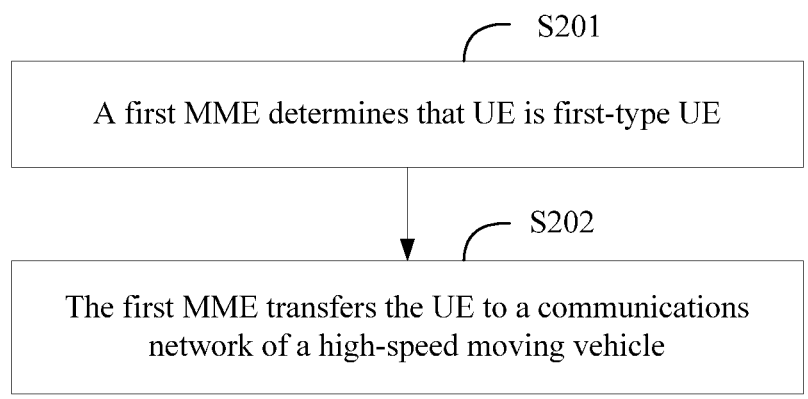
FIG. 2 is a schematic diagram of a method for controlling UE to access a communications network of a high-speed moving vehicle according to an embodiment of the present invention.

FIG. 2 is a flowchart of a method for controlling UE to access a communications network of a high-speed moving vehicle (for example, a high-speed railway dedicated network) according to an embodiment of the present invention. The method is executed by a first core network control plane node device (for example, a public network MME, or an MME shared by the public network and the high-speed railway dedicated network).

As shown in FIG. 2, the method includes the following steps.

S201. A first MME determines that UE accessing a public network is first-type UE.

S202. The first MME transfers the UE to a high-speed railway dedicated network.

Specifically, the first MME may determine that the UE accessing the public network is first-type UE according to notification information sent by a second MME. The second MME refers to a dedicated network MME or an MME shared by the public network and a dedicated network.

In one embodiment, after the second MME determines that the UE is first-type UE, and sends the notification information to the first MME, the first MME determines that the UE accessing the public network is first-type UE according to the notification information sent by the dedicated network MME. How the second MME determines that the UE is first-type UE is further described with reference to FIG. 3.

The notification information includes but is not limited to a context response message or a forward relocation request message. Optionally, the context response message and/or the forward relocation request message carry/carries indication information, and the indication information is used to indicate that the UE is first-type UE. Alternatively, the context response message and/or the forward relocation request message carry/carries a correspondence between a user identifier of the UE and the first-type UE.

After the first MME determines that the UE is first-type UE in the foregoing manners, S202 may specifically include:

After receiving the indication information carried in the context response message or the forward relocation request message, the first MME may directly reject an access request of the UE, and trigger the UE to perform network reselection to access the high-speed railway dedicated network or reside in the high-speed railway dedicated network.

Alternatively, after receiving the indication information carried in the UE context response message or the forward relocation request message, the first MME may first accept a service request of the UE (for example, a TAU request or a handover request), and subsequently instruct a public network eNodeB to migrate the UE out of the public network and access the high-speed railway dedicated network. Specifically, the first MME sends notification information to the public network eNodeB that serves the UE. The notification information is used to notify the public network eNodeB that the UE is first-type UE, and/or instruct the public network eNodeB to migrate the UE into the high-speed railway dedicated network.

Therefore, after receiving the notification information from the first MME, the public network eNodeB migrates the UE into the high-speed railway dedicated network. Optionally, after receiving the notification information from the first MME, the public network eNodeB may directly migrate the UE back to the high-speed railway dedicated network in a handover or relocation manner. Alternatively, after receiving the notification information from the first MME, the public network eNodeB calculates a speed of the UE. After determining that the speed of the UE is higher than a preset value, the public network eNodeB migrates the UE back to the high-speed railway dedicated network in the handover or relocation manner.

In another embodiment, the first MME may determine by itself that the UE accessing the public network is first-type UE in any one of the following manners:

(1) For UE in an idle state, if the first MME finds that a quantity of times of triggering a TAU procedure by the UE within a preset time is greater than a preset value (for example, the preset value is greater than 1), that is, a TA in which the UE is located changes for multiple times, the first MME determines that the UE is first-type UE.

(2) For UE in an idle state, when the UE initiates a TAU procedure, if the first MME finds that a TAU request message comes from a public network eNodeB close to the high-speed railway dedicated network, the UE is subsequently paged at intervals. If the first MME identifies that paging response messages come from different eNodeBs for continuous N times (N>=2), and these different eNodeBs are public network eNodeBs close to the high-speed railway dedicated network, the first MME determines that the UE is first-type UE. A paging interval for the UE may be set with reference to a distance between eNodeBs in the public network and a speed of a high-speed railway train. Related eNodeB information is configured in the first MME, and is used to determine whether an eNodeB is a public network eNodeB close to the high-speed railway dedicated network.

(3) For UE in a connected state, if the first MME finds that a quantity of change times, within a preset time, of a base station that serves the UE is greater than a preset value, the first MME determines that the UE is first-type UE.

(4) For UE in a connected state, if the first MME identifies that eNodeBs that serve the UE for continuous N times (N>=2) are different, and these different eNodeBs are public network eNodeBs close to the high-speed railway dedicated network, the first MME determines that the UE is first-type UE. Related eNodeB information is configured in the first MME, and is used to determine whether an eNodeB is a public network eNodeB close to the high-speed railway dedicated network.

(5) The first MME receives indication information sent by the public network eNodeB. The indication information is used to indicate that the UE is first-type UE. The first MME determines that the UE is first-type UE according to the indication information.

For example, a public network eNodeB that serves the UE may determine, according to a speed measurement algorithm (for example, a Doppler shift algorithm), that the UE in the connected state is moving at a high speed, and determines that the UE is first-type UE. After determining that the UE in the connected state is first-type UE, the public network eNodeB sends the indication information to the first MME, so that the first MME determines that the UE is first-type UE.

Preferably, after the first MME determines that the UE is first-type UE, if the UE is in the idle state, the MME pages the UE to the connected state, so that the public network eNodeB subsequently migrates the UE in the connected state into the high-speed railway dedicated network.

After the first MME determines that the UE is first-type UE in the foregoing manners, S202 may specifically include:

After receiving the indication information carried in the UE context response message or the forward relocation request message, the first MME may first accept a service request of the UE (for example, a TAU request or a handover request), and subsequently instruct the public network eNodeB to migrate the UE out of the public network and access the high-speed railway dedicated network. Specifically, the first MME sends notification information to the public network eNodeB that serves the UE. The notification information is used to notify the public network eNodeB that the UE is first-type UE, and/or instruct the public network eNodeB to migrate the UE into the high-speed railway dedicated network.

Therefore, after receiving the notification information from the first MME, the public network eNodeB migrates the UE into the high-speed railway dedicated network. Optionally, after receiving the notification information from the first MME, the public network eNodeB may directly migrate the UE back to the high-speed railway dedicated network in a handover or relocation manner. Alternatively, after receiving the notification information from the first MME, the public network eNodeB calculates a speed of the UE. After determining that the speed of the UE is higher than a preset value, the public network eNodeB migrates the UE back to the high-speed railway dedicated network in the handover or relocation manner.

Therefore, if UE that is first-type UE accesses the public network by mistake, after the first MME determines that the UE is first-type UE, the UE may be migrated out of the public network and access the high-speed railway dedicated network. Therefore, user experience of the first-type UE is improved.

Optionally, in this embodiment, after the first MME executes step S202, the method further includes:

S203. After the UE is migrated back to the high-speed railway dedicated network, the UE initiates a TAU procedure to a second MME. Therefore, the second MME sends a context request message to the first MME, the first MME sends a context response message to the second MME, and the context response message is used to indicate that the UE is first-type UE. Alternatively, when the first MME receives a handover/relocation request message sent by a public network base station, where the handover/relocation request message is used to hand over the UE to the dedicated network, the first MME sends a forward relocation message to the second MME. The forward relocation message is used to indicate that the UE is first-type UE.

Figure 3:
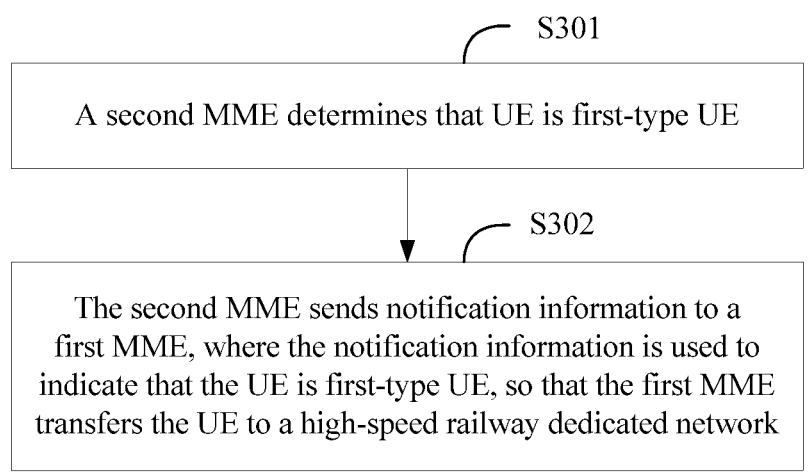
FIG. 3 is another schematic diagram of a method for controlling UE to access a communications network of a high-speed moving vehicle according to an embodiment of the present invention.

FIG. 3 is a flowchart of a method for controlling UE to access a communications network of a high-speed moving vehicle according to an embodiment of the present invention. The method is executed by a second core network control plane node device (for example, a dedicated network MME, or an MME shared by a dedicated network and a public network).

As shown in FIG. 3, the method includes the following steps.

S301. A second MME determines that UE is first-type UE.

After first UE accesses a high-speed railway dedicated network through a railway station area, step S301 includes step 301a. In step 301a, the second MME may determine that the UE is first-type UE by using three different granularities: cell, eNodeB, and TA.

Specifically, the second MME may determine that the UE is first-type UE by using three different granularities: cell, eNodeB, and TA.

(1) The second MME determines that the UE is first-type UE by using the cell granularity.

When the UE accesses the high-speed railway dedicated network from a cell of a railway station area, the second MME determines that the UE is first-type UE.

For example, information about a dedicated network cell that is corresponding to the high-speed railway dedicated network and within the railway station area is configured in the second MME. The information about the dedicated network cell includes but is not limited to a cell identity of the dedicated network cell. When the UE enters a connected state, the UE sends NAS signaling to the second MME. The second MME may identify, according to cell information of the UE reported by a base station, whether the UE is located in the dedicated network cell. When the second MME identifies that the UE is located in the dedicated network cell, the second MME determines that the UE is first-type UE.

(2) The second MME determines that the UE is first-type UE by using the eNodeB granularity.

When the UE accesses the high-speed railway dedicated network from a base station of the railway station area, the second MME determines that the UE is first-type UE.

For example, information about a dedicated network eNodeB that is corresponding to the high-speed railway dedicated network and within the railway station area is configured in the second MME. The information about the dedicated network eNodeB includes but is not limited to an identity or an IP address of the dedicated network eNodeB. All signaling of the UE is sent to the second MME by using an eNodeB. Therefore, the second MME may identify whether an eNodeB that serves the UE is a dedicated network eNodeB according to eNodeB information. When the second MME identifies that a base station that serves the UE is a dedicated network eNodeB, the second MME determines that the UE is first-type UE.

(3) The second MME determines that the UE is first-type UE by using the TA granularity.

When the UE accesses the high-speed railway dedicated network from a TA of the railway station area, the second MME determines that the UE is first-type UE.

In this case, a dedicated network MME and a public network MME may be separately deployed, or a high-speed railway TA and a non-high-speed railway TA may be separately planned in one MME device. If all high-speed railway areas belong to one TA, whether the UE is first-type UE may be determined in the foregoing manner (1) or manner (2). Information about a dedicated network tracking area identity (TAI for short) that is corresponding to the high-speed railway dedicated network and within the railway station area is configured in the second MME. For example, a dedicated network TAI and a public network TAI may be distinguished by using tracking area codes (TAC for short) in the TAIs.

After the UE accesses an indoor distributed cell or a platform cell of the railway station, due to a TA change, the UE initiates a tracking area update (TAU for short) procedure, an attach procedure, a service request procedure, a handover procedure, or the like to the second MME by using an eNodeB. The UE or the eNodeB reports a currently located TAI or a target TAI of the UE to an MME 330 by using the TAU procedure, the attach procedure, the service request procedure, or the handover procedure. The second MME may identify whether the currently located TAI or the target TAI is a dedicated network TAI according to the currently located TAI or the target TAI reported by the UE or the eNodeB. When the second MME identifies that the currently located TAI or the target TAI reported by the UE or the eNodeB is a dedicated network TAI, the second MME determines that the UE is first-type UE.

For example, when switch-on UE in an idle state enters the railway station from the railway station square, the UE initiates a TAU procedure to the second MME because a TA in which the UE is located changes. When the UE initiates the TAU procedure to the second MME, the TAI in which the UE is currently located and that is reported to the second MME by the eNodeB that serves the UE is a dedicated network TAI of the railway station area. Therefore, the second MME determines that the UE is first-type UE. For another example, when UE that is performing a service enters the railway station from the railway station square, a service switching procedure may occur. In this case, the second MME receives a target TAI sent by an original network eNodeB and an original network MME. The second MME determines that the target TAI is a dedicated network TAI in the railway station area, and further determines that the UE is first-type UE. A manner in which the second MME determines that the UE is first-type UE according to a TAI reported in another procedure is similar to the foregoing description, and is not repeatedly described herein.

After first UE accesses the high-speed railway dedicated network through a track area, step 301 includes step 301b. In step 301b, the second MME determines that the UE is first-type UE.

Specifically, the second MME may determine that the UE is first-type UE by using three different granularities: cell, eNodeB, and TA.

(1) The second MME determines that the UE is first-type UE by using the cell granularity.

When the UE moves from a first cell of the track area of the high-speed railway dedicated network to a second cell of the track area of the high-speed railway dedicated network, and the UE accesses the high-speed railway dedicated network from the second cell, the second MME determines that the UE is first-type UE.

For example, information about a dedicated network cell that is corresponding to the high-speed railway dedicated network and within the track area is configured in the second MME. The information about the dedicated network cell includes but is not limited to a cell identity of the dedicated network cell. The second MME may identify, according to multiple pieces of cell information of the UE reported by a base station, whether the UE is located in the dedicated network cell. When the second MME identifies that the UE moves among multiple dedicated network cells, the second MME determines that the UE is first-type UE.

(2) The second MME determines that the UE is first-type UE by using the eNodeB granularity.

When the UE moves from a first base station of the track area of the high-speed railway dedicated network to a second base station of the track area of the high-speed railway dedicated network, and the UE accesses the high-speed railway dedicated network from the second base station, the second MME determines that the UE is first-type UE.

For example, information about a dedicated network eNodeB that is corresponding to the high-speed railway dedicated network and within the track area is configured in the second MME. The information about the dedicated network eNodeB includes but is not limited to an identity or an IP address of the dedicated network eNodeB. All signaling of the UE is sent to the second MME by using an eNodeB. Therefore, the second MME may identify whether multiple eNodeBs that serve the UE are dedicated network eNodeBs according to the eNodeB information. When the second MME identifies that the multiple base stations that serve the UE are dedicated network eNodeBs, the second MME determines that the UE is first-type UE.

(3) The second MME determines that the UE is first-type UE by using the TA granularity.

When the UE moves from a first TA of the track area of the high-speed railway dedicated network to a second TA of the track area of the high-speed railway dedicated network, and the UE accesses the high-speed railway dedicated network from the second TA, the second MME determines that the UE is first-type UE.

In this case, a dedicated network MME and a public network MME may be separately deployed, or a high-speed railway TA and a non-high-speed railway TA may be separately planned in one MME device. If all high-speed railway areas belong to one TA, whether the UE is first-type UE may be determined in the foregoing manner (1) or manner (2). Information about a dedicated network TAI that is corresponding to the high-speed railway dedicated network and within the track area is configured in the second MME. For example, a dedicated network TAI and a public network TAI may be distinguished by using TACs in the TAIs. After the UE accesses the dedicated network in the track area, a service procedure may be initiated due to a requirement or a TAU procedure or a handover procedure may be triggered due to a movement. The UE or the eNodeB that serves the UE reports a source TAI and a target TAI, or a new TAI and an old TAI of the UE to the second MME by using the TAU procedure, the service request procedure, the handover procedure, or the like. The second MME may identify whether both the source TAI and the target TAI or the new TAI and the old TAI are dedicated network TAIs according to the source TAI and the target TAI or the new TAI and the old TAI that are reported by the UE or the eNodeB. When the second MME identifies that both the source TAI and the target TAI that are reported by the UE are dedicated network TAIs, the second MME determines that the UE is first-type UE.

(4) The second MME receives indication information sent by a dedicated network base station. The indication information is used to indicate that the UE is first-type UE. The second MME determines that the UE is first-type UE according to the indication information.

For example, a dedicated network eNodeB that serves the UE may determine, according to a speed measurement algorithm (for example, a Doppler shift algorithm), that the UE in the connected state is moving at a high speed, and determines that the UE is first-type UE. After determining that the UE in the connected state is first-type UE, the dedicated network eNodeB sends the indication information to the second MME, so that the second MME determines that the UE is first-type UE.

After the second MME determines that the UE is first-type UE, optionally, the second MME records a correspondence between a user identifier of the UE and the first-type UE. For example, the second MME may record, in a context of the UE, the correspondence between the user identifier and the first-type UE, so that the second MME subsequently determines whether UE that has a specific determined identifier is first-type UE.

S302. The second MME sends notification information to a first MME, where the notification information is used to indicate that the UE is first-type UE, so that the first MME transfers the UE to a high-speed railway dedicated network.

For example, the notification information includes but is not limited to a context response message or a forward relocation request message. How the second MME sends the context response message or the forward relocation request message to the first MME is further described in the following with reference to FIG. 4 and FIG. 5.

Figure 4:
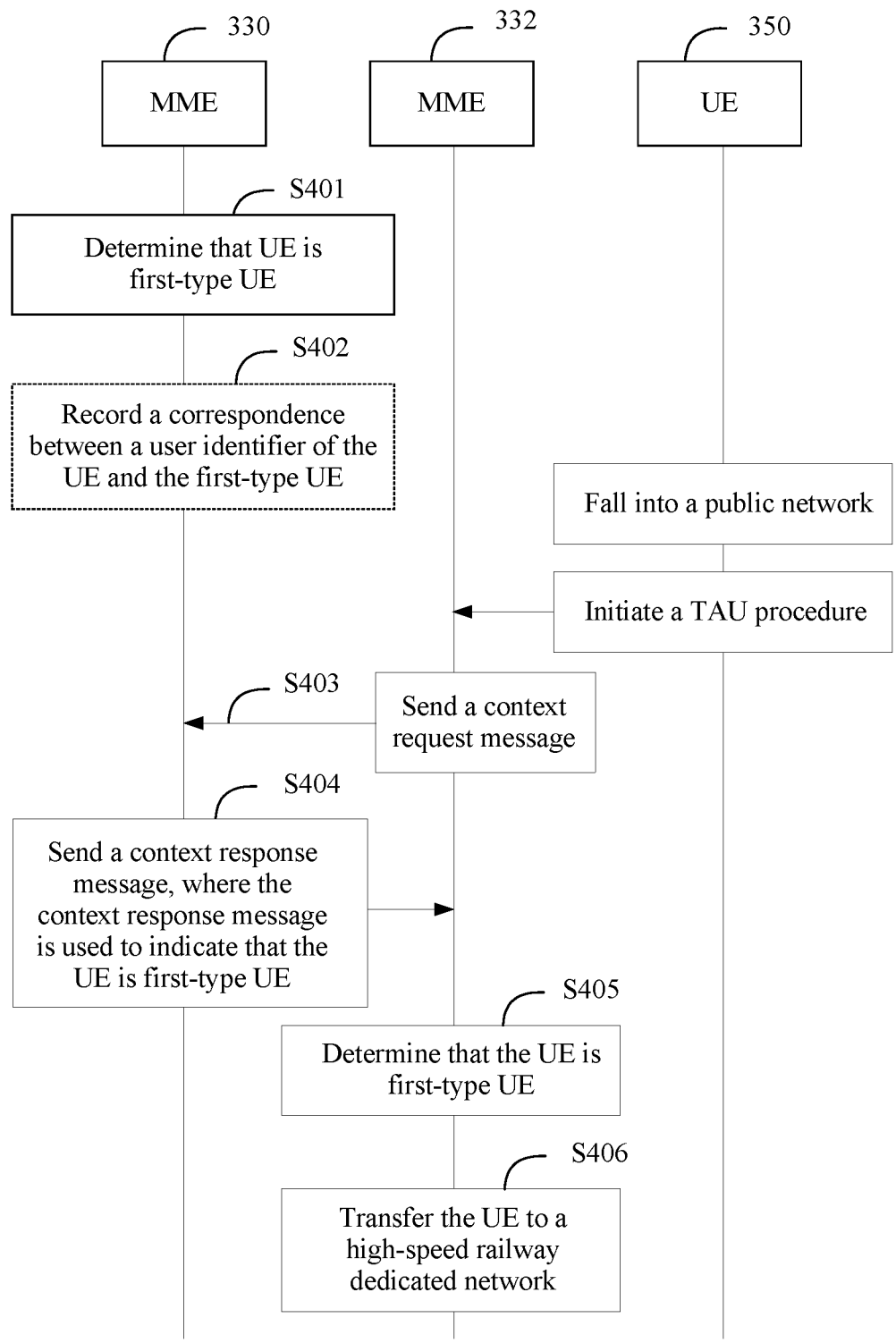
FIG. 4 is another schematic diagram of a method for controlling UE to access a communications network of a high-speed moving vehicle according to an embodiment of the present invention.
Figure 5:
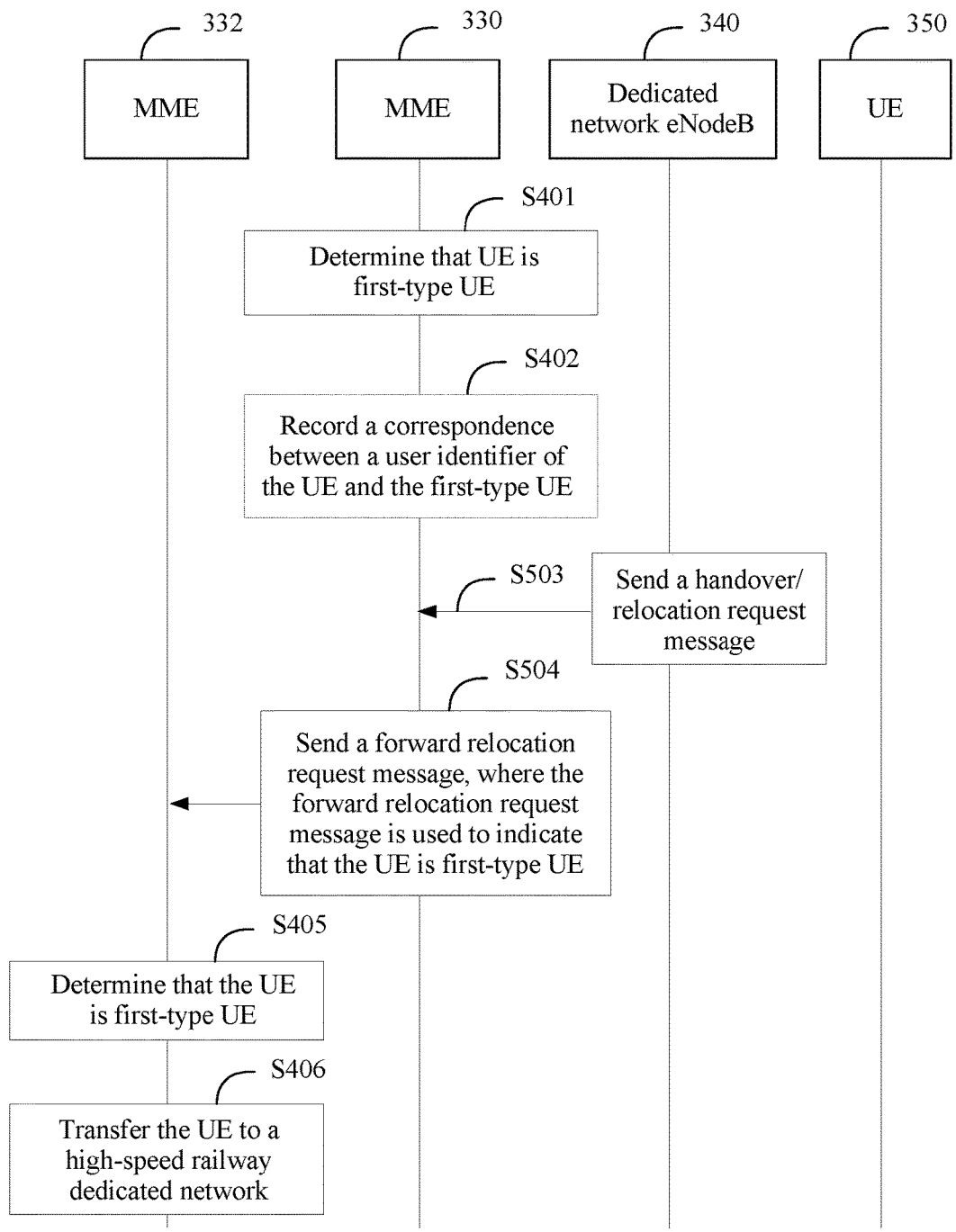
FIG. 5 is another schematic diagram of a method for controlling UE to access a communications network of a high-speed moving vehicle according to an embodiment of the present invention.

FIG. 4 and FIG. 5 are flowcharts of methods for controlling UE to access a communications network of a high-speed moving vehicle according to an embodiment of the present invention. The method in FIG. 4 is executed cooperatively by an MME 330, an MME 332, and UE 350 in a communications system. The method in FIG. 5 is executed cooperatively by the MME 330, the MME 332, the UE 350, and a dedicated network eNodeB 340 in the communications system. The MME 330 is a dedicated MME of a high-speed railway dedicated network, or an MME shared by a high-speed railway dedicated network and a public network. The MME 332 is a dedicated MME of the public network, or an MME shared by the high-speed railway dedicated network and the public network.

Data related to the high-speed railway dedicated network needs to be configured in the MME 330 and/or the MME 332. For example, the data related to the high-speed railway dedicated network includes information about an eNodeB of the high-speed railway dedicated network and/or information about a public network eNodeB near the high-speed railway dedicated network. The information about the eNodeB includes but is not limited to an identity or an IP address of the eNodeB. Therefore, the MME 330 and/or the MME 332 may learn, according to the information about the eNodeB, whether the eNodeB belongs to the high-speed railway dedicated network or the high-speed railway public network. In addition, if TAs of the high-speed railway dedicated network and the public network are individually deployed, for example, a public network TA and a dedicated network TA are distinguished by using TACs, the data related to the high-speed railway dedicated network further includes TA information of the high-speed railway dedicated network, and the TA information includes but is not limited to a TAI. Optionally, the data related to the high-speed railway dedicated network further includes cell information of the high-speed railway dedicated network, and the cell information includes but is limited to a cell identity.

When a user enters the railway station and waits for a train, because dedicated network signals of an indoor distributed cell and a platform cell are relatively strong, most UE may leave the public network cell and access the platform cell or the indoor distributed cell, and therefore access the high-speed railway dedicated network. The eNodeB of the high-speed railway dedicated network and the MME of the high-speed railway dedicated network provide services for the UE. When a high-speed railway train departs and leaves the platform, if a mobility management procedure (for example, a TAU procedure, a handover procedure, or another service procedure) occurs because the UE moves, most UE is still attached to the high-speed railway dedicated network and does not enter the public network because a signal of a cell of the high-speed railway dedicated network is relatively strong.

In the example of FIG. 4, the method specifically includes:

S401. The MME 330 determines that the UE accessing the high-speed railway dedicated network is first-type UE. Refer to the description in FIG. 3 for how the MME 330 determines that the UE accessing the high-speed railway dedicated network is first-type UE, and details are not repeatedly described.

Optionally, in S402, the MME 330 records a correspondence between a user identifier of the UE and the first-type UE. For example, the MME 330 may record, in a context of the UE, the correspondence between the user identifier and the first-type UE, so that the MME 330 subsequently determines whether UE that has a specific determined identifier is first-type UE.

When the UE 350 falls into the public network and initiates a mobility management area update procedure (for example, a TAU procedure) to the MME 332, in S403, the MME 332 sends a context request message to the MME 330.

S404. The MME 330 returns a context response message to the MME 332, where the context response message is used to indicate that the UE 350 is first-type UE, so that the MME 332 transfers the UE 350 to the high-speed railway dedicated network. Optionally, the context response message carries indication information, where the indication information is used to indicate that the UE is first-type UE, or the context response message carries the correspondence between the user identifier of the UE and the first-type UE.

Therefore, in S405, the MME 332 determines that the UE 350 is first-type UE according to the received context response message.

S406. The MME 332 transfers the UE 350 to the high-speed railway dedicated network. Refer to the description in FIG. 2 for how the MME 332 transfers the UE 350 to the high-speed railway dedicated network, and details are not repeated described herein.

In another embodiment, steps S403 and S404 are replaced by steps S503 and S504, as shown in FIG. 5.

S503. When the UE initiates a handover procedure, the dedicated network eNodeB 340 sends a handover/relocation request message to the MME 3300. The handover/relocation request message is used to hand over the UE 350 to the public network.

S504. The MME 330 sends a forward relocation request message (Forward Relocation Request) to the MME 332, where the forward relocation request message is used to indicate that the UE is first-type UE, so that the MME 332 transfers the UE 350 to the high-speed railway dedicated network. Optionally, the forward relocation request message carries indication information, where the indication information is used to indicate that the UE is first-type UE, or the forward relocation request message carries the correspondence between the user identifier of the UE and the first-type UE.

Figure 6:
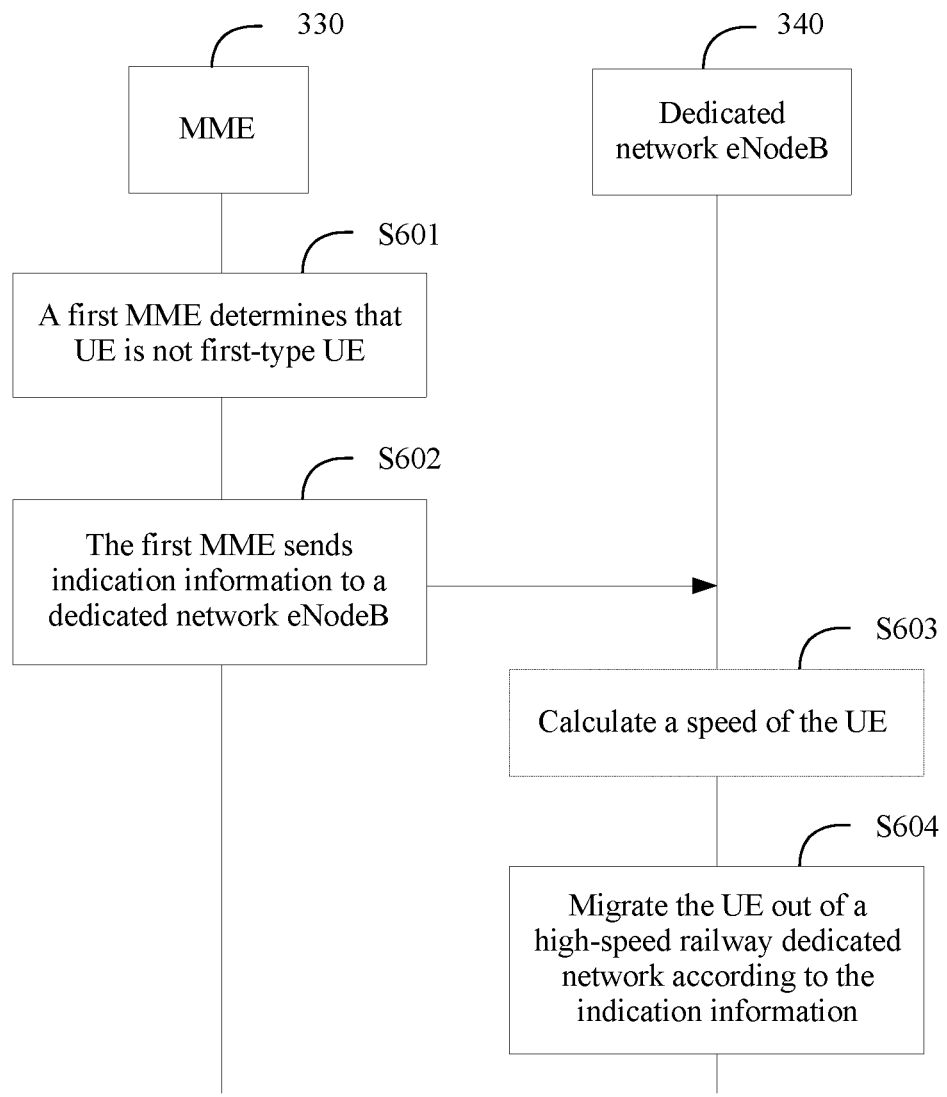
FIG. 6 is another schematic diagram of a method for controlling UE to access a communications network of a high-speed moving vehicle according to an embodiment of the present invention.

FIG. 6 is a flowchart of a method for controlling UE to access a high-speed railway dedicated network according to another embodiment of the present invention. The method in FIG. 6 is executed cooperatively by an MME 330 and an eNodeB 340. As shown in FIG. 6, the method includes the following steps.

S601. The MME 330 determines that UE accessing a high-speed railway dedicated network is not first-type UE.

Specifically, the MME 330 may determine that the UE is not first-type UE in either of the following two manners.

(1) For UE in an idle state, if the MME 330 finds that the UE is located in a same TA within a period of time, or a quantity of change times of a TA of the UE within a period of time is less than a preset value, the MME 330 determines that the UE is not first-type UE. An average speed of a high-speed moving vehicle may be considered when the preset value is being set. Preferably, after the MME 330 determines that the UE is not first-type UE, if the UE is in the idle state, the MME 330 pages the UE to a connected state, so that a dedicated network eNodeB subsequently migrates the UE in the connected state out of the high-speed railway dedicated network.

(2) For UE in the connected state, if the MME 330 finds that a dedicated network eNodeB that serves the UE does not change within a period of time, or a quantity of change times, within a period of time, of a dedicated network eNodeB that serves the UE is less than a preset value, the MME 330 determines that the UE is not first-type UE. An average speed of a high-speed moving vehicle may be considered when the preset value is being set.

S602. The MME 330 sends indication information to the eNodeB 340, where the indication information is used to instruct the eNodeB 340 to migrate the non-first-type UE out of the high-speed railway dedicated network.

S604. The eNodeB 340 migrates the non-first-type UE out of the high-speed railway dedicated network.

Specifically, after receiving the indication information sent by the MME 330, the eNodeB 340 directly migrates the UE out of the high-speed railway dedicated network in a handover or relocation manner; or after receiving indication notification information sent by the MME 330, a second core network control plane node device, the base station eNodeB 340 first calculates a speed of the UE in S603. After determining that the speed of the UE is lower than a preset value, the eNodeB 340 transfers the UE out of the high-speed railway dedicated network, a communications network of the high-speed moving vehicle, in the handover or relocation manner.

Therefore, by performing the foregoing steps, UE that actually belongs to a public network but accesses a communications network of a high-speed moving vehicle by mistake, for example, UE near a track of the high-speed moving vehicle may access a dedicated network in an attach procedure when being switched on, or UE accessing the public network, may access the communications network of the high-speed moving vehicle after network reselection when an exception occurs. In this scenario, a dedicated network MME determines that the UE is not first-type UE, and removes UE of this type out of the communications network of the high-speed moving vehicle, so as to ensure that resources on the communications network of the high-speed moving vehicle are not wasted.

When UE leaves a railway station, the UE enters a public network signal coverage area from a dedicated network signal coverage area, and the UE triggers a service procedure and accesses a public network, for example, a TAU procedure or a handover procedure. In the service procedure, even if a public network MME learns that the UE is originally first-type UE, the public network MME does not send a notification message to an eNodeB that serves the UE, so as to trigger migration of the UE back to a dedicated network; or even if an eNodeB that serves the UE receives a migrate-out notification message from the public network MME, the eNodeB neglects the message and does not migrate the UE back to the dedicated network, so that when a user leaves the railway station, no ping-pong handover occurs, and the UE is still attached.

Figure 7:
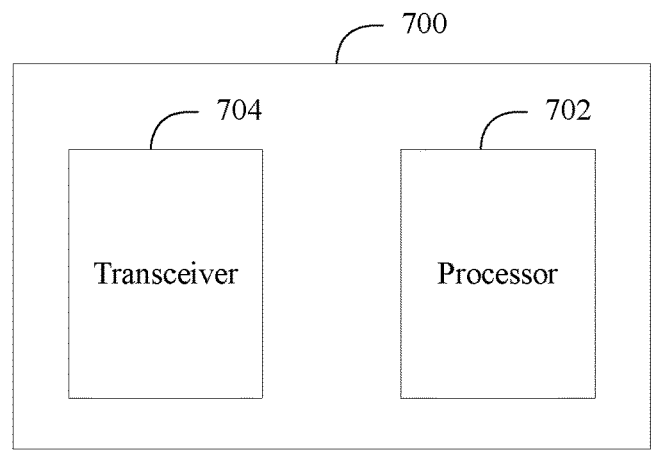
FIG. 7 is a block diagram of a first core network control plane node device according to an embodiment of the present invention.

FIG. 7 is a block diagram of a control plane node device 700 of a core network according to an embodiment of the present invention. The control plane node device 700 of the core network in FIG. 7 may be configured to execute method steps of the first core network control plane node device in FIG. 2, and the MME 332 in FIG. 4 or FIG. 5. The control plane node device 700 of the core network includes a processor 702 and a transceiver 704.

The processor 702 is configured to determine that user equipment UE accessing a public network is first-type UE. Accordingly, the control plane node device 700 of the core network is configured to transfer the UE to a communications network of a high-speed moving vehicle.

Optionally, in an embodiment, the control plane node device 700 of the core network determines that the UE is first-type UE according to notification information sent by a second core network control plane node device. Specifically, the transceiver 704 is configured to receive the notification information sent by the second core network control plane node device. The processor 702 is configured to determine that the UE is first-type UE according to the notification information. The notification information is sent to the control plane node device 700 of the core network after the second core network control plane node device determines that the UE is first-type UE.

Optionally, the notification information includes a context response message or a forward relocation request message.

In this embodiment, the control plane node device 700 of the core network may transfer the UE to the communications network of the high-speed moving vehicle in either of the following manners:

(1) The transceiver 704 is configured to send indication information to a public network base station, where the indication information is used to indicate that the UE is first-type UE, so that the public network base station transfers the UE to the communications network of the high-speed moving vehicle.

(2) The processor 702 is configured to reject a request for accessing the public network by the UE, so that the UE performs network reselection to access the communications network of the high-speed moving vehicle or camps on the communications network of the high-speed moving vehicle.

In another embodiment, the control plane node device 700 of the core network determines by itself that the UE is first-type UE. For example, the control plane node device 700 of the core network may determine by itself that the UE is first-type UE in any one of the following manners:

(1) For the UE in an idle state, if a quantity of change times, within a preset time, of a mobility management area in which the UE is located is greater than a preset value, the processor 702 is configured to determine that the UE is first-type UE.

(2) For the UE in a connected state, if a quantity of change times, within a preset time, of a base station that serves the UE is greater than a preset value, the processor 702 is configured to determine that the UE is first-type UE.

(3) The transceiver 704 is further configured to receive indication information sent by a public network base station, where the indication information is used to indicate that the UE is first-type UE; and the processor 702 is configured to determine that the UE is first-type UE according to the indication information.

Optionally, after the control plane node device 700 of the core network determines that the UE is first-type UE, the processor 702 is further configured to page the UE to the connected state, so that the public network base station migrates the UE into the communications network of the high-speed moving vehicle.

In this embodiment, after the control plane node device 700 of the core network determines that the UE is first-type UE, the transceiver 704 is configured to send indication information to the public network base station, where the indication information is used to indicate to the public network base station that the UE is first-type UE, so that the public network base station transfers the UE to the communications network of the high-speed moving vehicle.

Figure 8:
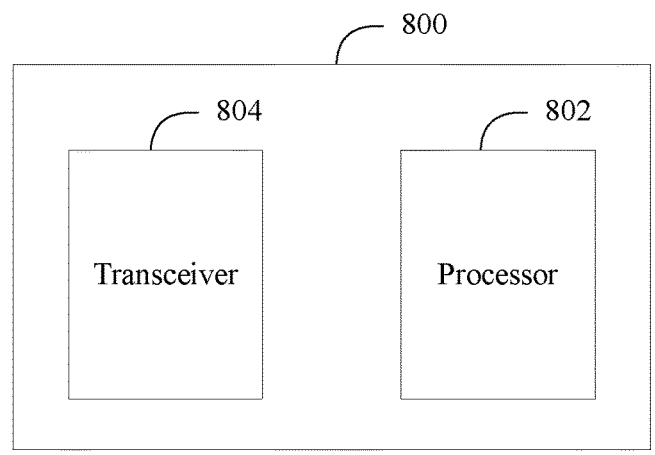
FIG. 8 is a block diagram of a public network base station according to an embodiment of the present invention.

FIG. 8 is a block diagram of a public network base station 800 according to an embodiment of the present invention. The base station 800 includes a transceiver 804 and a processor 802.

The transceiver 804 is configured to receive indication information sent by a control plane node device 700 of a core network. The indication information is sent to the base station after the control plane node device 700 of the core network determines that user equipment UE accessing a public network is first-type UE. The indication information is used to indicate that the UE accessing the public network is first-type UE. The processor 802 is configured to transfer the UE to a communications network of a high-speed moving vehicle according to the indication information.

Optionally, the processor 802 is further configured to compute a speed of the UE. If the speed of the UE is higher than a preset value, the processor 802 is configured to transfer the UE to the communications network of the high-speed moving vehicle.

Optionally, the processor 802 is further configured to determine that UE in a connected state is first-type UE according to a speed measurement algorithm. The transceiver 804 is further configured to send the indication information to the control plane node device 700 of the core network, so that the control plane node device 700 of the core network determines that the UE is first-type UE according to the indication information.

Figure 9:
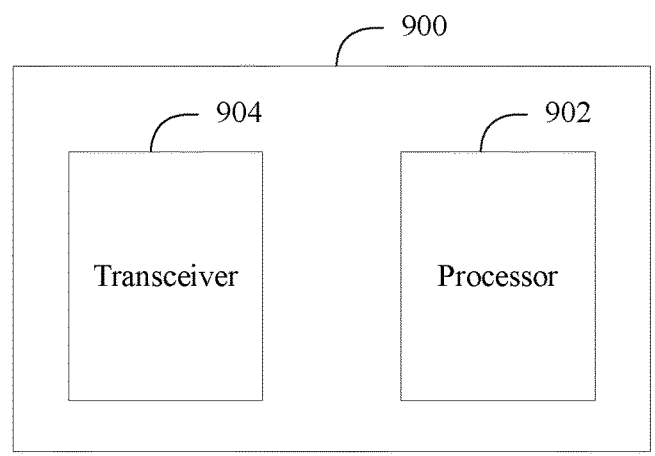
FIG. 9 is a block diagram of a second core network control plane node device according to an embodiment of the present invention.

FIG. 9 is a block diagram of a control plane node device 900 of a core network according to an embodiment of the present invention. The control plane node device 900 of the core network in FIG. 9 may be configured to execute method steps of the second core network control plane node device in FIG. 3, and the MME 330 in FIG. 4 or FIG. 5. The control plane node device 900 of the core network includes a processor 902 and a transceiver 904.

The processor 902 is configured to determine that user equipment UE accessing a communications network of a high-speed moving vehicle is first-type UE. The transceiver 904 is configured to send notification information to a control plane node device 700 of a first core network, where the notification information is used to indicate that the UE is first-type UE, so that the control plane node device 700 of the first core network transfers the UE accessing a public network to the communications network of the high-speed moving vehicle.

Optionally, the notification message includes a context response message. When the first-type UE accesses the public network and initiates a mobility management area update procedure to the control plane node device 700 of the first core network, the transceiver 904 is configured to receive a context request message sent by the control plane node device 700 of the first core network. The transceiver 904 is configured to send the context response message to the control plane node device 700 of the first core network. The context response message carries indication information, where the indication information is used to indicate that the UE is first-type UE, or the context response message carries a correspondence between a user identifier of the UE and the first-type UE.

Alternatively, the notification message includes a forward relocation request message. The transceiver 904 is configured to receive a handover/relocation request message sent by a dedicated network base station. The handover/relocation request message is used to hand over the first-type UE to the public network. The transceiver 904 is configured to send the forward relocation request message to the control plane node device 700 of the first core network. The forward relocation request message carries indication information, where the indication information is used to indicate that the UE is first-type UE, or the forward relocation request message carries a correspondence between a user identifier of the UE and the first-type UE.

When the UE accesses the communications network of the high-speed moving vehicle from a first area (for example, a railway station area) of a high-speed railway dedicated network, the processor 902 may determine that the UE is first-type UE in any one of the following manners:

(1) When the UE accesses the communications network of the high-speed moving vehicle from a mobility management area of the first area, the processor 902 is configured to determine that the UE is first-type UE.

(2) When the UE accesses the communications network of the high-speed moving vehicle from a base station of the first area, the processor 902 is configured to determine that the UE is first-type UE.

(3) When the UE accesses the communications network of the high-speed moving vehicle from a cell of the first area, the processor 902 is configured to determine that the UE is first-type UE.

When the UE accesses the communications network of the high-speed moving vehicle from a second area (for example, a track area) of a high-speed railway dedicated network, the processor 902 may determine that the UE is first-type UE in any one of the following manners:

(1) When the UE moves from a first mobility management area of the second area of the communications network to a second mobility management area of the second area, and the UE accesses the communications network from the second mobility management area, the processor 902 is configured to determine that the UE is first-type UE.

(2) When the UE moves from a first base station of the second area to a second base station of the second area, and the UE accesses the communications network from the second base station, the processor 902 is configured to determine that the UE is first-type UE.

(3) When the UE moves from a first cell of the second area to a second cell of the second area, and the UE accesses the communications network from the second cell, the processor 902 is configured to determine that the UE is first-type UE.

(4) The transceiver 904 is configured to receive indication information sent by the base station, where the indication information is used to indicate that the UE is first-type UE; and the processor 902 is configured to determine that the UE is first-type UE according to the indication information.

Figure 10:
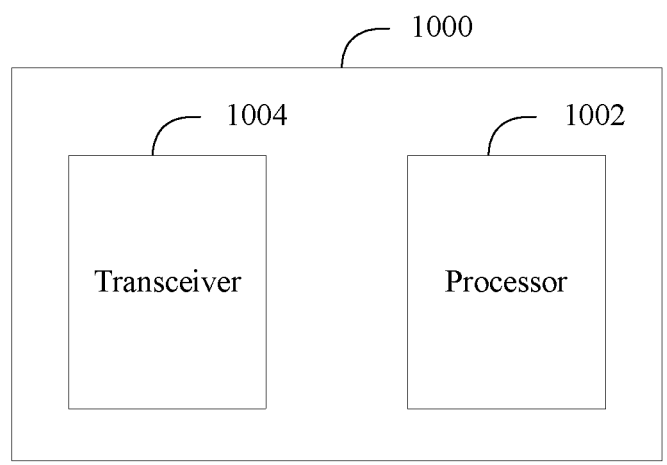
FIG. 10 is a block diagram of a core network control plane node device according to an embodiment of the present invention.

FIG. 10 is a block diagram of a control plane node device 1000 of a core network according to an embodiment of the present invention. The control plane node device 1000 of the core network in FIG. 10 may be configured to execute method steps of the MME 330 in FIG. 6. The control plane node device 1000 of the core network includes a processor 1002 and a transceiver 1004.

The processor 1002 is configured to determine that user equipment UE accessing a communications network of a high-speed moving vehicle is not first-type UE. The transceiver 1004 is configured to send indication information to a base station of the communications network of the high-speed moving vehicle, where the indication information is used to indicate the base station that the UE is non-first-type UE, so that the base station migrates the UE out of the communications network of the high-speed moving vehicle.

For example, the processor 1002 determines that the UE is not first-type UE in either of the following manners:

(1) For the UE in an idle state, if the UE is in a same mobility management area within a preset time, or a quantity of change times of a mobility management area of the UE within the preset time is less than a preset value, the processor 1002 is configured to determine that the UE is not first-type UE.

(2) For the UE in a connected state, if a base station that is of the communications network of the high-speed moving vehicle and serves the UE does not change within a preset time, or a quantity of change times, within a preset time, of a base station that is of the communications network of the high-speed moving vehicle and serves the UE is less than a preset value, the processor 1002 is configured to determine that the UE is not first-type UE.

Optionally, the processor 1002 is further configured to page the UE to the connected state, so that the base station migrates the UE out of the communications network of the high-speed moving vehicle.

Figure 11:
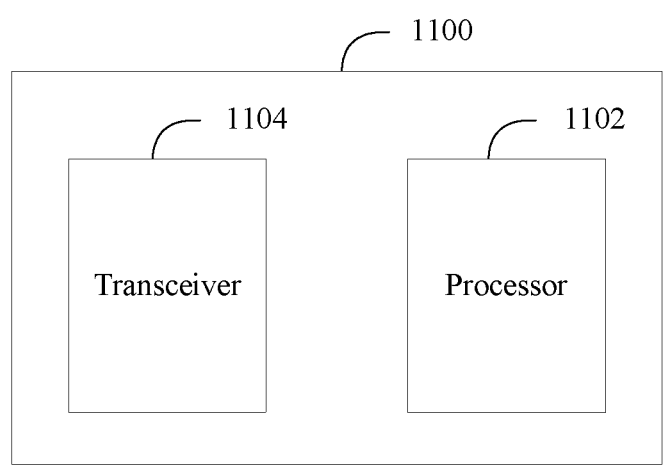
FIG. 11 is a block diagram of a base station of a communications network of a high-speed moving vehicle according to an embodiment of the present invention.

FIG. 11 is a block diagram of a dedicated network base station 1100 according to the present invention. The dedicated network base station 1100 in FIG. 11 may be configured to execute method steps of the base station 340 in FIG. 6. The dedicated network base station 1100 includes a processor 1102 and a transceiver 1104.

The transceiver 1104 is configured to receive indication information sent by a core network control plane node device, where the indication information is sent to the base station after the core network control plane node device determines that user equipment UE accessing a communications network of the high-speed moving vehicle is not first-type UE, and the indication information is used to indicate that the UE is non-first-type UE. The processor 1102 is configured to migrate the UE out of the communications network of the high-speed moving vehicle according to the indication information.

Optionally, after the base station receives the indication information sent by the core network control plane node device, and before the base station migrates the UE out of the communications network of the high-speed moving vehicle, the processor 1102 is further configured to calculate a speed of the UE. If the speed of the UE is lower than a preset value, the processor 1102 is configured to migrate the UE out of the communications network of the high-speed moving vehicle.

An LTE network is used as an example for description in the foregoing description. However, the present invention is not limited thereto. The present invention is also applicable to a GSM network or a UMTS network. When the present invention is applied to the GSM network or the UMTS network, core network control plane node devices are an SGSN and an MSC. In the LTE network, a mobility management area is a TA, and correspondingly, in the 2G/3G network, the mobility management area is a routing area (RA for short) and a location area (LA for short). In addition, in the LTE network, a TAU procedure is caused due to a movement, and correspondingly, in the 2G/3G network, a routing area update (RAU for short) procedure and a location area update (LAU for short) procedure are caused.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for controlling a user equipment (UE) to access a communications network of a moving vehicle, comprising:
   determining, by a first core network control plane node device, that a UE accessing a public network is a first-type UE, wherein the first-type UE is a UE that is used by a user taking the moving vehicle; and
   transferring, by the first core network control plane node device, the UE to the communications network of the moving vehicle, wherein the transferring the UE to the communications network comprises performing at least one of:
      sending, by the first core network control plane node device, indication information to a public network base station, the indication information causing the public network base station to transfer the UE to the communications network of the moving vehicle; or
      rejecting, by the first core network control plane node device, a request for accessing the public network by the UE, the rejecting the request for accessing public network causing the UE to access the communications network of the moving vehicle.

2. The method according to claim 1, wherein the determining that the UE accessing the public network is the first-type UE comprises:
   receiving, by the first core network control plane node device, notification information sent by a second core network control plane node device, and determining that the UE is the first-type UE according to the notification information, wherein the notification information is sent to the first core network control plane node device after the second core network control plane node device determines that the UE is the first-type UE.

3. The method according to claim 2, wherein the notification information comprises at least one of a context response message or a forward relocation request message.

4. The method according to claim 1, wherein the indication information indicates that the UE is the first-type UE.

5. The method according to claim 1, wherein the rejecting the request for accessing the public network by the UE causes the UE to access the communications network of the moving vehicle by at least one of network reselection to access the communications network of the moving vehicle or camping on the communications network of the moving vehicle.

6. The method according to claim 1, wherein the determining that UE accessing the public network is the first-type UE comprises performing at least one of:
   determining, by the first core network control plane node device, for the UE in an idle state, if a quantity of change times, within a preset time, of a mobility management area in which the UE is located is greater than a preset value, that the UE is first-type UE; or
   determining, by the first core network control plane node device, for the UE in a connected state, if a quantity of change times, within a preset time, of a base station that serves the UE is greater than a preset value, that the UE is first-type UE; or
   receiving, by the first core network control plane node device, indication information sent by a public network base station, wherein the indication information indicates that the UE is the first-type UE, and determining, by the first core network control plane node device, that the UE is the first-type UE according to the indication information.

7. The method according to claim 6, wherein the method further comprises:
   paging the UE to the connected state after the first core network control plane node device determines that the UE in the idle state is the first-type UE, so that the public network base station migrates the UE into the communications network of the moving vehicle.

8. The method according to claim 6, wherein the mobility management area comprises at least one of a tracking area (TA), a routing area (RA), a location area (LA), or a cell.

9. The method according to claim 6,
   wherein the indication information indicates to the public network base station that the UE is the first-type UE.

10. The method according to claim 1, wherein the first core network control plane node device comprises at least one of a mobility management entity (MME), or a serving general packet radio service GPRS support node (SGSN), or a mobile switching center (MSC).

11. A first core network control plane node device, comprising:
   a processor; and
   a non-transitory computer-readable storage medium storing a program to be executed by the processor, the program including instructions to:

determine that a user equipment (UE) accessing a public network is a first-type UE, wherein the first-type UE is UE used by a user taking a moving vehicle; and transfer the UE to a communications network of the moving vehicle, wherein the instructions to transfer the UE to the communications network comprises instructions to perform at least one of:

send indication information to a public network base station, the indication information causing the public network base station to transfer the UE to the communications network of the moving vehicle; or reject a request for accessing the public network by the UE, the rejecting the request for accessing public network causing the UE to access the communications network of the moving vehicle.

12. The first core network control plane node device according to claim 11, further comprising a transceiver, wherein the transceiver receives notification information sent by a second core network control plane node device; and wherein the program includes instructions to determine that the UE is the first-type UE according to the notification information, and wherein the notification information is sent to the first core network control plane node device after the second core network control plane node device determines that the UE is the first-type UE.

13. The first core network control plane node device according to claim 12, wherein the notification information comprises at least one of a context response message or a forward relocation request message.

14. The first core network control plane node device according to claim 11, wherein the indication information indicates that the UE is the first-type UE.

15. The first core network control plane node device according to claim 11, wherein the rejecting the request for accessing the public network by the UE causes the UE to access the communications network of the moving vehicle by at least one of a network reselection to access the communications network of the moving vehicle or camping on the communications network of the moving vehicle.

16. The first core network control plane node device according to claim 11, wherein at least one of:

the program has instructions to determine, for the UE in an idle state, if a quantity of change times, within a preset time, of a mobility management area in which the UE is located is greater than a preset value, that the UE is the first-type UE; or the program has instructions to determine, for the UE in a connected state, if a quantity of change times, within a preset time, of a base station that serves the UE is greater than a preset value, that the UE is the first-type UE; or the first core network control plane node device further comprises a transceiver configured to receive indication information sent by a public network base station, wherein the indication information indicates that the UE is the first-type UE, and the program has instructions to determine that the UE is the first-type UE according to the indication information.

17. The first core network control plane node device according to claim 16, wherein the program further has instructions to page the UE to the connected state after the processor determines that the UE in the idle state is the first-type UE, so that the public network base station migrates the UE into the communications network of the moving vehicle.

18. The first core network control plane node device according to claim 16, wherein the mobility management area comprises at least one of a tracking area (TA), a routing area (RA), a location area (LA), or a cell.

19. The first core network control plane node device according to claim 16, wherein the indication information indicates to the public network base station that the UE is the first-type UE.

20. A non-transitory computer-readable media storing computer instructions for controlling a user equipment (UE) to access a communications network of a moving vehicle, wherein the computer instructions, when executed by one or more processors, cause the one or more processors to:

determine that a UE accessing a public network is a first-type UE, wherein the first-type UE is a UE used by a user taking the moving vehicle; and transfer the UE to the communications network of the moving vehicle, wherein the instructions to transfer the UE to the communications network comprises instructions to perform at least one of:

send indication information to a public network base station, the indication information causing the public network base station to transfer the UE to the communications network of the moving vehicle; or reject a request for accessing the public network by the UE, the rejecting the request for accessing public network causing the UE to access the communications network of the moving vehicle.

* * * * *